United States Patent [19]

Rogerson

[11] 3,841,282

[45] Oct. 15, 1974

[54] AIR SUPPLY VALVE
[75] Inventor: Jerry B. Rogerson, Dearborn, Mich.
[73] Assignee: Ford Motor Company, Dearborn, Mich.
[22] Filed: Feb. 28, 1973
[21] Appl. No.: 336,594

[52] U.S. Cl. ..... 123/97 B, 123/124 R, 123/DIG. 11, 137/480
[51] Int. Cl. ...................... F02m 23/04, F02d 33/02
[58] Field of Search........... 123/124 R, 124 B, 97 B, 123/DIG. 11; 137/480

[56] References Cited
UNITED STATES PATENTS

| | | | |
|---|---|---|---|
| 2,065,773 | 12/1936 | Van Ranst | 123/124 R |
| 3,043,286 | 7/1962 | Blomberg | 123/124 B |
| 3,561,409 | 2/1971 | August | 123/124 R |
| 3,585,976 | 6/1971 | Rider | 123/124 R |
| 3,698,371 | 10/1972 | Mitsuyama | 123/97 B |

FOREIGN PATENTS OR APPLICATIONS

| | | | |
|---|---|---|---|
| 104,641 | 6/1926 | Austria | 123/124 R |

Primary Examiner—Wendell E. Burns
Attorney, Agent, or Firm—Joseph W. Malleck; Keith L. Zerschling

[57] ABSTRACT

An integrated air supply system and ignition cut-off mechanism are shown for use as add-on equipment for an internal combustion engine having an induction system with the usual intake manifold. The air supply system functions to introduce air directly to the intake manifold in multiple stages corresponding to the magnitude of intake manifold vacuum, thereby prevent backfiring in the exhaust manifold; similarly, during conditions of engine shut-down the air supply functions to dilute the engine air-fuel mixture for a predetermined period. A valve comprises part of the multiple stage air-supply system and is responsive to the outlet pressure of said system.

2 Claims, 1 Drawing Figure

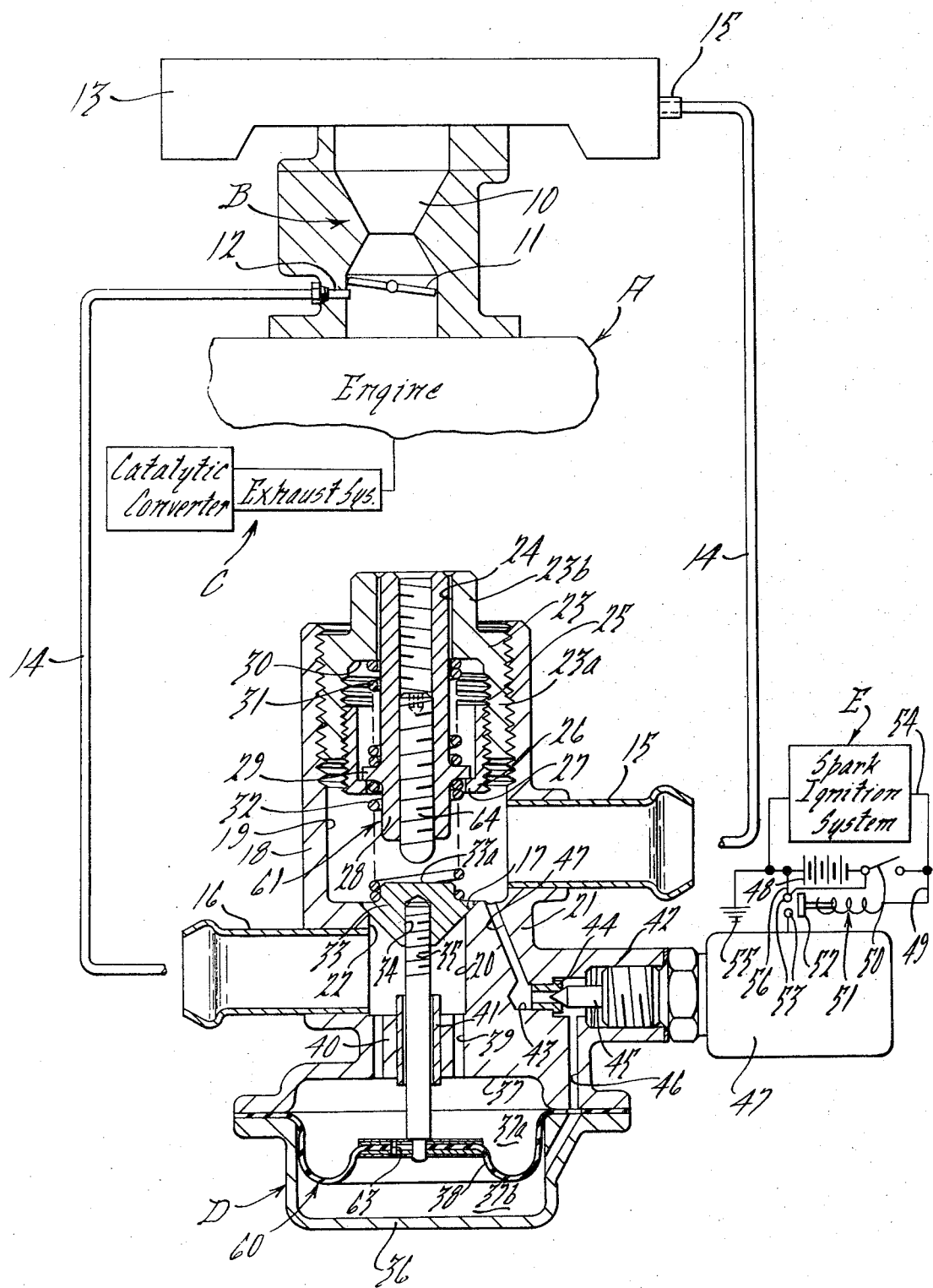

AIR SUPPLY VALVE

BACKGROUND OF THE INVENTION

Backfiring, or igniting of unburned constituents in the exhaust flow from an engine has been a troublesome problem; the problem becomes more acute in light of modern emission control systems which require a device such as a catalytic converter in the exhaust system to achieve proper emission levels. Backfiring, which may occur in the exhaust system, can stimulate a near-flaming combustion in the catalytic converter causing destruction to the effectiveness of the converter elements.

During periods of deceleration, such as from high speed operation, extremely low absolute pressures (high vacuums) are formed in the combustion chambers and intake manifold of an internal combustion engine. Relief of the vacuum cannot be accomplished by the entry of air through the engine carburetor because the carburetor valve is usually closed. The high vacuum can draw some fuel into the combustion chambers through the carburetor idle jets that are located slightly downstream of the throttle valve. Historically, a significant portion of this unwanted fuel was exhausted unburned from the engine. This cannot be tolerated with modern emission apparatus that is used to meet proposed Federal Standards. Rich air-fuel mixtures, which seem to predominate during deceleration and engine shut-down, must be remedied. The problem is not a simple one in that deceleration levels change during operation depending upon the load conditions of the engine at the time; the distinctively different condition of the engine during engine shut-down presents a further complication.

It has become known that the low pressures, present in engine combustion chambers during deceleration, render it difficult for complete combustion to occur irrespective of the air-fuel mixture present in these chambers. In order for complete combustion, the vacuum developed during deceleration must be relieved. If this vacuum is relieved by admitting air through the carburetor, the resulting air-fuel mixture will be too lean to burn. However, overly lean mixtures are also disadvantageous because of the promotion of increased hydrocarbon emissions that result from the lack of combustion.

SUMMARY OF THE INVENTION

It is a primary object of this invention to overcome the above problems and provide a means for introducing air to the induction system of an engine so as to reduce manifold vacuum, but to do so in a manner to accommodate deceleration conditions of the engine and the condition of the engine during shut down.

Accordingly, it is a specific feature of this invention to provide a multi-staged air power valve which is effective to control introduction of air quantities to achieve an air/fuel ratio appropriate to the condition of engine during deceleration or shut down.

It is still another object of this invention to provide an air supply valve which is effective to introduce additional quantities of air to the intake manifold during conditions of deceleration and during engine shut down, the valve being arranged to stage such air introduction so as to maintain a tight limit of air/fuel ratios that will not damage a catalytic converter used in conjunction with the exhaust system of the engine.

SUMMARY OF THE DRAWING

The FIGURE is a partly schematic and partly sectional elevational view of an engine equipped with an air supply system for controlling manifold vacuum during deceleration and engine shut down.

DETAILED DESCRIPTION

Turning now to the drawing, a preferred embodiment is illustrated, comprising broadly: a staged air supply system which is useful with an internal combustion engine A having a typical induction system B for supplying a mixture of air and fuel to the engine. The engine further has a typical exhaust system C preferably equipped with a catalytic converter forming part thereof. The air supply system has a power valve D interposed in a duct 14 interconnecting ambient air conditions with a port 12 in the induction system. The induction system may have a conventional plain tube-type carburetor 10 with a conventional throttle valve 11 immediately upstream from port 12. A typical air cleaner 13, having duct 14 connected thereto at 15, is employed to screen the air being inducted into the induction system B.

The air supply system of this invention is adapted to prevent backfiring in the exhaust system by supplying air in staged quantities in proportion to the magnitude of deceleration of the engine and during shut down of the engine.

To this end, the power valve D comprises a valve housing comprised of an upper portion 18 with an internal cylindrical wall 19 defined therein to form an upper chamber; a lower portion 21 has an internal cylindrical wall 20 defining a lower chamber. An inlet 15, connected to duct 14, communicates with the upper chamber (defined by wall 19). An outlet 16 communicates with the lower chamber (defined by wall 20) and continues the connection to duct 14 which in turn communicates with port 12 of the intake manifold. The upper and lower chambers are directly interconnected by a bore 22; an admitting assembly has a valve or element 33 employed to control the communication between the upper and lower chambers. Element 33 has a conical outer surface adapted to mate with a conical valve seat 17.

Movement of valve element 33 is accomplished in three stages to determine three different valve positions regulating the flow through opening 22 and thereby determining the proportionality of air flow. A first stage of the admitting assembly is provided by a resilient member, such as spring 32, having one end bearing against a shoulder of the valve element and an opposite end bearing against assembly 61 (adjustment elements and connecting elements for second stage), a second stage piston or member 28 is slidable within a necked portion 23a of housing extension 23; the larger portion 23b is threadably received in housing 18. A second stage spring 31 has one end bearing against a shoulder 30 of portion 23b and another end bearing against annular flange 29 of the member 28. Another adjustment sleeve 26 is adjustably threadably received within the internal surface 25 of portion 23a of element 23; an inwardly projecting flange 27 acts as a stop limiting the downward movement of the piston 28 as urged by spring 31 in that direction. The piston 28, during the first stage, held so that flange 29 maintains contact with flange 27, thus, spring 32 is first overcome by forces acting thru said valve 33.

To oppose the bias of spring 32 firstly, and then spring 31 during the second stage, a servo-mechanism or assembly 60 is provided. Assembly 60 comprises a chamber 37 defined by a flanged section of housing portion 21 closed by member 36. A diaphragm 38 bisects chamber 37 to define chamber portions 37a and 37b; a central portion of the diaphragm 38 is connected for positive movement with valve element 33 by way of a rod 35 having one end threadably received in an opening 34 in element 33. Rod 35 is journalled for reciprocal movement by way of a bushing 41 carried in a central casting 40 extending across annular opening 39; opening 39 communicates the lower chamber 22 with the chamber 37 of the servo-mechanism.

A cylindrical housing extension 42 is provided extending to one side and having therein an internal stepped bore 43. An insert 44 is adapted to seat against a shoulder of stepped bore 43 to define a valve seat or orifice, the orifice being normally closed by a needle valve 45. One side of orifice 43 is in communication, by way of passage 46, with chamber portion 37b to which the lower side of the diaphragm 38 is subjected. The other side of orifice 44 is in communication with the inlet side of the power valve by way of passage 47. A solenoid actuator 47 is effective to selectively move needle valve 45 away from the seat 44 thereby promoting free communication between passage 46 and 47 and thus allowing ambient air conditions to quickly obtain in chamber portion 37b.

Operation of the solenoid actuator is provided by an electrical circuit 55 which is adapted to receive power from a source 48 also powering a circuit 54 for the spark ignition system E; another circuit 49 contains a manual ignition switch 50. When switch 50 is closed during normal automotive operation, current flows to another solenoid switch actuator 51 effective to withdraw a switch element 52, breaking connection between contacts 56 and thereby holding the actuator 47 de-energized. Upon opening of manual switch 50, when engine shut down is initiated, the solenoid 51 will be de-energized thereby allowing switch element 52 to close contacts 56 and energize actuator 47 to open needle valve 45. Ambient air then conveyed to chamber 37b forcing diaphragm 38 upwardly and valve 33 to a maximum open position. This arrangement is effective for a "pull" type solenoid actuator. It may be preferable to avoid such circuitry by the use of a push type actuator normally energized through the closed ignition switch.

In operation, weak deceleration of the engine will cause the moderate to strong vacuum force in the intake manifold to lower the absolute pressure in chamber portion 37a causing diaphragm to move uwardly overcoming proportionately the bias of spring 32. Valve 33 will open a few thousands of an inch in relation to the low range magnitude of the vacuum. Ambient air will be admitted through the opening 22 from inlet 15 to outlet 16; the ambient air will be conveyed to the intake manifold substantially diluting the air/fuel mixture. If the engine deceleration is heavy, the much higher vacuum will not only cause diaphragm 38 to urge valve 33 against the force of spring 31, but upon sufficient upward travel due to heavy vacuum, side 33a of valve 33 will engage pin 64 (which is adjustably threadably received in piston 28) which is virtually a part of piston 28. Piston 28 then is urged toovercome second stage spring 31 (a higher calibrated spring) to afford an even greater opening of valve 33.

A predetermined timed closure of valve 33 is provided by a bleed port 63 in diaphragm 38 which is calibrated to equalize absolute pressure on opposite sides thereof after a predetermined time delay; the valve 33 is thus restored to a closed position.

When engine shut down is initiated by turning the ignition key to an off position, ambient air is shunted around to chamber portion 37a to assist any vacuum force in opening valve 33 to a maximum position, flooding the intake manifold with air. Port 63 operates in a reverse direction to stabilize under spring on opposite sides of the diaphragm and close the valve 33 under spring force.

Adjustment of sleeve 26 provides an adjustable setting for the first stage of the valve since it varies the compression on spring 32. Adjustment of element 23 provides an adjustable setting for the second stage of the valve since it can vary the compression spring 31, assuming sleeve 26 is adjusted to retain a fixed position. Pin 64 is adjustable within member 28 to vary the stroke of element 33 during the first stage.

I claim:

1. In an internal combustion engine having an induction system for supplying a mixture of air and fuel to an intake manifold thereof and a spark ignition system, the combination comprising:
    a. a duct supplying ambient air to said intake manifold,
    b. means controlling admission of air through said duct only during conditions of engine deceleration, said means being effective to vary the quantity of ambient air so admitted in proportion to the magnitude of said engine deceleration, and
    c. means responsive to de-energization of said spark ignition system to override said proportioning means so that a predetermined maximum amount of ambient air is admitted through said duct.

2. In an internal combustion engine having an induction system for supplying a mixture or air and fuel to an intake manifold thereof, the combination comprising:
    a. a duct supplying ambient air to said intake manifold, and
    b. means controlling admission of air through said duct only during conditions of engine deceleration, said means being effective to vary the quantity of ambient air so admitted in proportion to the magnitude of said engine deceleration, said admitting means comprising a valve element normally biased to a position closing said duct, and a servo mechanism for overcoming said bias in response to engine deceleration, said servo mechanism having a diaphragm operably connected to said element and subject to pressure in said intake manifold so that, upon a sudden increase in manifold vacuum due to engine deceleration, the vacuum pressure on said diaphragm will urge said valve element to an open position in opposition to said bias, said bias comprising an assembly providing staged bias forces to define a second stage, said assembly has a movable second element, a stop, and a second spring urging said second element against said stop, to define a first stage said assembly has a first spring acting between said stopped second element and said valve element to urge said valve element to a closed position, said valve element being moved to a minimum range of positions when said servo-mechanism is effective to overcome only said first spring and to a maximum range of position when said servo-mechanism is effective to overcome not only said first spring but also said second spring.

* * * * *